United States Patent [19]

Neumann

[11] Patent Number: 4,773,027

[45] Date of Patent: Sep. 20, 1988

[54] AUTOMATED TRASH MANAGEMENT SYSTEM

[75] Inventor: Rodney H. Neumann, Houston, Tex.

[73] Assignee: MGM Services, Inc., Houston, Tex.

[21] Appl. No.: 875,066

[22] Filed: Jun. 17, 1986

[51] Int. Cl.⁴ .......................... G06F 11/30; B30B 1/32

[52] U.S. Cl. .................................... 364/550; 364/558; 100/49; 100/50; 100/229 A; 53/529; 414/517

[58] Field of Search ............... 364/550, 551, 558, 508; 100/229 R, 49, 50, 51, 52, 53, 99, 35, 41, 43, 45; 53/527, 529; 414/549, 409, 487, 541, 525 R, 517, 516; 73/818, 820, 821, 825

[56] References Cited

U.S. PATENT DOCUMENTS

| | | | |
|---|---|---|---|
| 4,068,096 | 1/1978 | Rattenborg et al. | 379/47 |
| 4,100,849 | 7/1978 | Pelton | 100/41 |
| 4,147,893 | 4/1979 | Matson | 379/99 |

*Primary Examiner*—Parshotam S. Lall
*Assistant Examiner*—David C. Goldman
*Attorney, Agent, or Firm*—Dodge, Bush & Moseley

[57] ABSTRACT

An automated trash management system for measuring the fullness of a plurality of trash containers, each trash container associated with a packing system having a compression member for engaging and compacting the trash in the container and, optionally having a limit switch activated by the compression member when the compression member is fully extended for controlling the movement of the compression member by the packing system. The automated trash management system comprises a plurality of remote status units each in association with a trash container comprising a sensing device for monitoring the pressure provided to the compression member by the compacting system and means for determining the fullness of the trash container based upon the monotonic increase in pressure associated with the compression member engaging and compacting the trash in a container, a central unit for receiving the container fullness calculations from each remote status unit and for compiling a data base of the fullness of each trash container and a communications linkage for transferring the fullness calculations from said plurality of remote status units to the central units such that the fullness of each trash container can be monitored at the single location of the central unit, and from the same single location, authorization to a hauler to empty the trash containers can be restricted to only those containers which are approaching full thereby reducing the frequency of and the expense of hauling.

12 Claims, 6 Drawing Sheets

FIG. 3
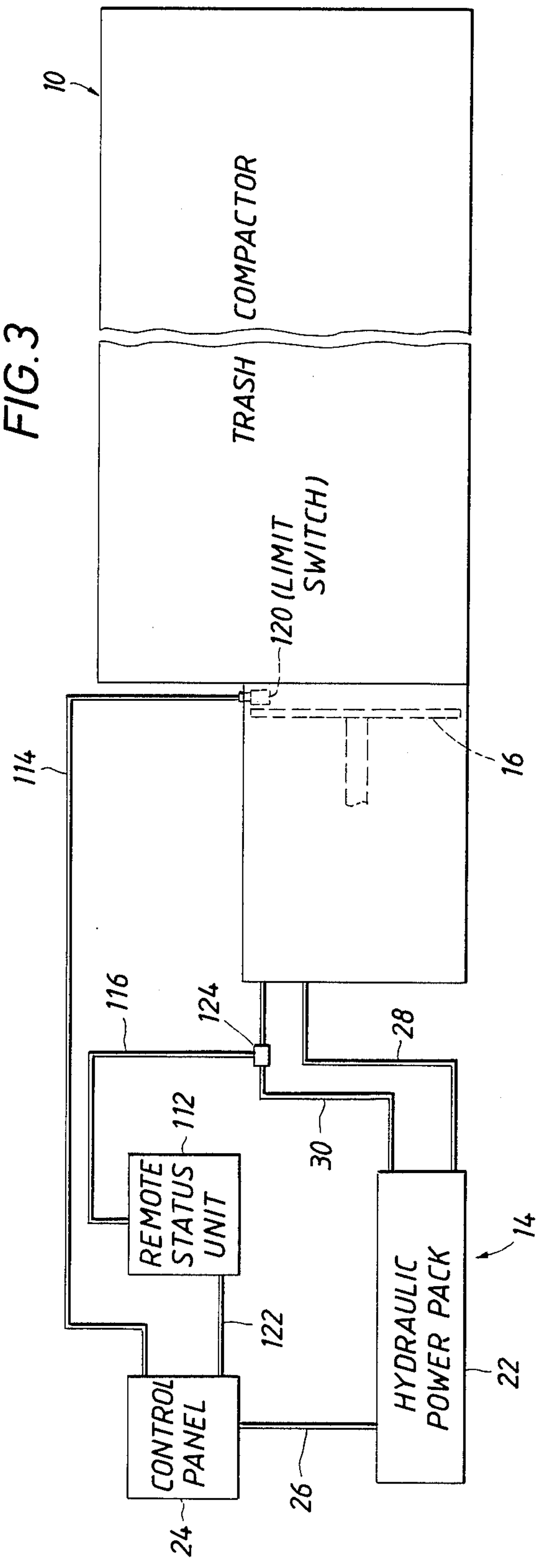
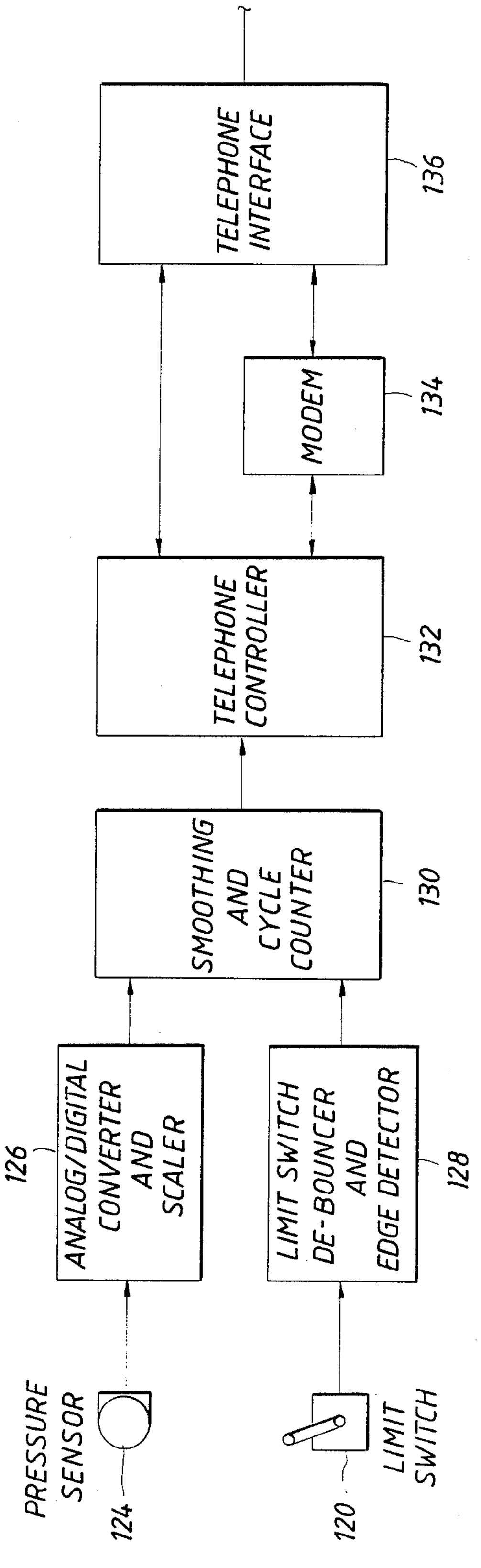
FIG. 4

LIMIT SWITCH METHOD

RATE OF INCREASE LIMITER

FIG. 7
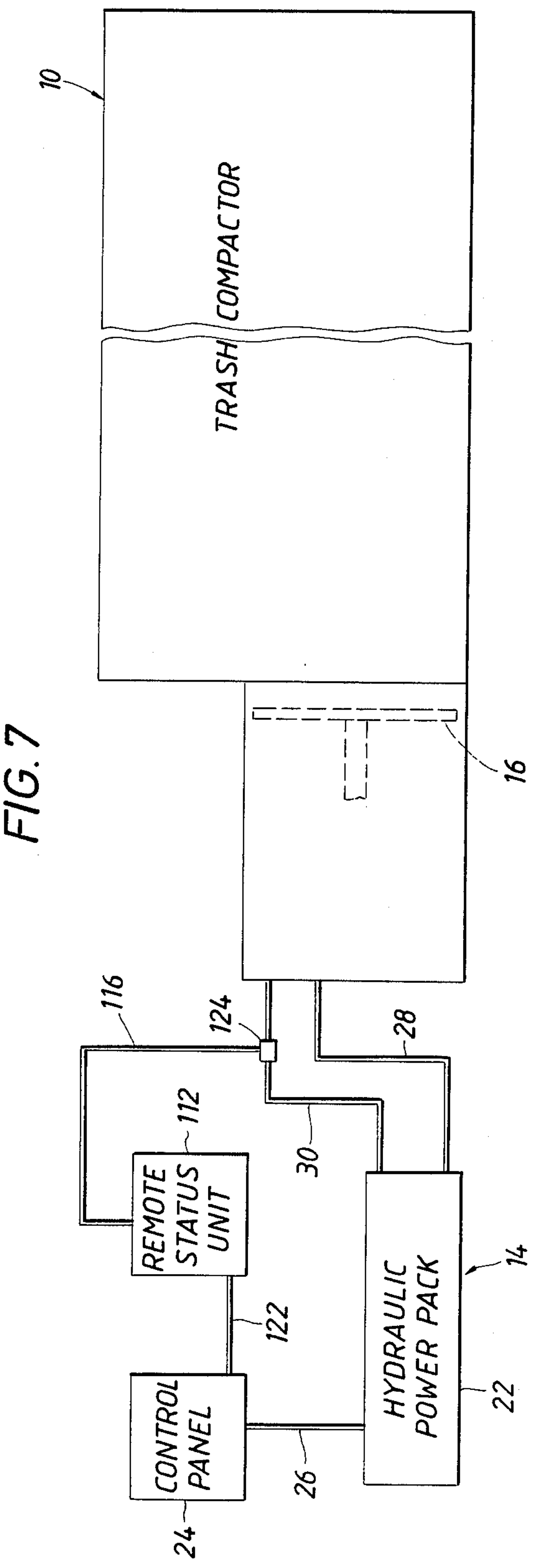
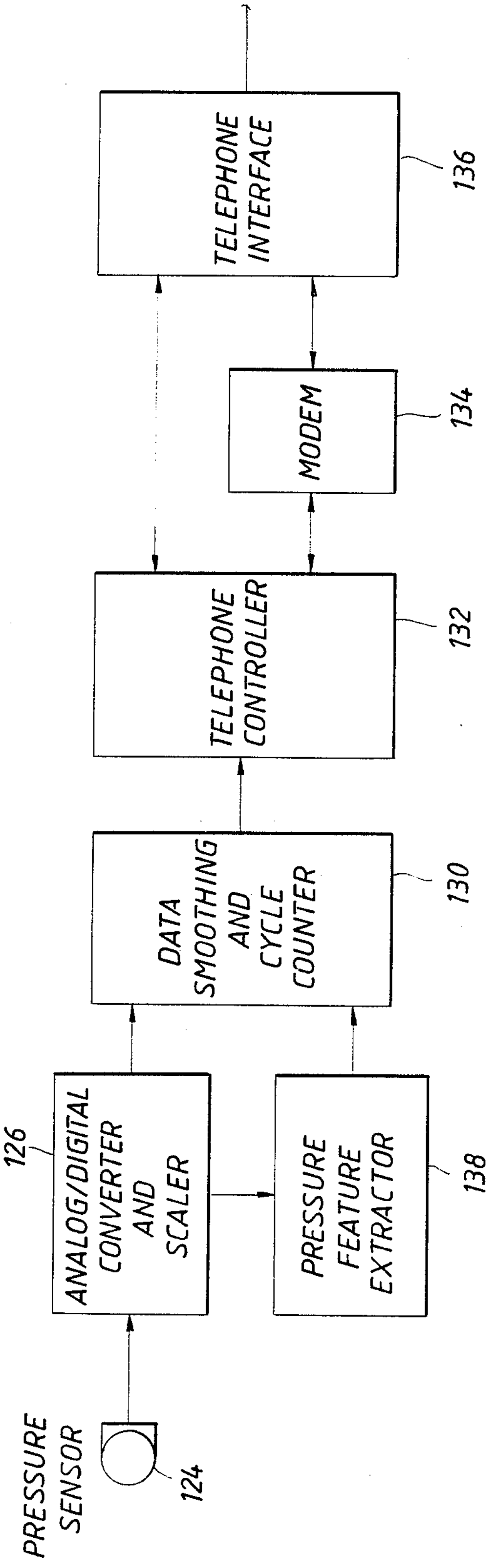
FIG. 8

NON-LIMIT SWITCH METHOD

AUTOMATED TRASH MANAGEMENT SYSTEM

FIELD OF THE INVENTION

The present invention relates generally to the effective management of trash compactor/container units. More particularly, the present invention relates to an apparatus for monitoring, controlling and coordinating the hauling of a plurality of trash compactor/container units to provide that the units are emptied only when appropriately full.

BACKGROUND OF THE INVENTION

Due to the ever increasing volume, the effective disposal of trash has become extremely important socially and monetarily. It has become readily apparent that the demand for single use or "throw-away" items has greatly increased. The increased quantity of "throw-away" items and receptacles has created a great need for the effective disposal of trash.

Accordingly, it has become necessary to effectively dispose of great volumes of trash, especially in high population density areas. One of the primary mechanisms for disposing of high volumes of trash in high population density areas has been the utilization of mobile trash containers. Mobile trash containers are placed adjacent homes, apartment complexes, businesses, factories, etc. The containers are filled by local users of disposable items. Typically, after a specified period of time, dependent on the local user, a hauler goes to each trash container and empties the trash or exchanges a full container for an empty container. The hauler takes the trash to a refuse center or land fill for permanent disposal. Mobile trash containers have been a great advance in efficiently removing trash, especially in high population density areas.

In an attempt to improve mobile trash containers, trash compactor units have been used. Typically, the trash compactor units are either built into the container to be a part thereof or removably associated with the container. The trash compactor unit helps to provide for the optimal use of the container. As the container is filled, the trash compactor acts to compress the trash in the container. Thus, the container can hold considerably more trash than if not compressed. The combination of the trash compactor and the trash container has been a substantial advancement in disposing of great volumes of trash.

Even with the use of the trash compactor/container units, it is still required to use a hauler to empty the containers. It can be appreciated that one of the largest expenses in maintaining an adequate trash removal system is the expense of the hauler. The hauling expense increases with the increase in the frequency of hauling containers. The hauling expense is greatly increased when containers are hauled that are less than full.

It is, therefore, a feature of the present invention to provide an automated trash management system to coordinate the hauling of a plurality of trash compactor/container units based upon their respective fullness or the anticipation of fullness to provide that the containers are emptied when appropriately full.

Another feature of the present invention is to provide an automated trash management system to monitor the fullness of a plurality of trash compactor/container units based upon an analysis of the number of cycles of the compactor and the pressure associated therewith.

Yet another feature of the present invention is to provide an automated trash management system which monitors the fullness of a plurality of trash compactor/container units based upon an analysis of the pressure associated with each compactor.

Still another feature of the present invention is to provide an automated trash management system to control the compression cycles of and the pressure exerted on trash in a plurality of trash compactor/container units.

Yet still another feature of the present invention is to monitor the fullness of a single trash compactor/container unit based upon the number of cycles of the compactor and the pressure associated therewith.

Another feature of the present invention is to monitor the fullness of a single trash compactor/container unit based upon an analysis of the pressure associated with the compactor.

Additional features and advantages of the invention will be set forth in part in the description which follows, and in part will become apparent from the description, or may be learned by practice of the invention. The features and advantages of the invention may be realized and obtained by means of the instrumentalities and combinations particularly pointed out in the appended claims.

SUMMARY OF THE INVENTION

To achieve the forgoing features and advantages and in accordance with the purposes of the invention as embodied and broadly described herein, an automated trash management system is provided for measuring the fullness of a plurality of trash containers, each trash container having a packing system, and each packing system having a compression member for engaging and compacting the trash in the container, the automated trash management system comprising a plurality of remote status units each in association with a trash container comprising a sensing device for monitoring the pressure provided to the compression member by the compacting system and means for receiving the monitored pressure for determining the fullness of the trash container based upon the monotonically increasing portions of the monitored pressure, a central unit for receiving the container fullness calculations from each remote status unit and for compiling a data base of the fullness of each trash container, and a communications linkage for transferring the fullness calculations from the plurality of remote status units to the central unit such that the fullness of each trash container can be monitored at the single location of the central unit and, from the location of the central unit, authorization to the hauler to empty the trash containers can be restricted to only those containers which are approaching full thereby reducing the frequency of and the expense of hauling.

More particularly, the means for calculating the fullness utilized in the automated trash management system comprises a data analysis device for receiving the pressure provided to the compression member by the packing system from the sensing device for smoothing the received data to minimize the effects of material tumbling in the trash container for reducing fluctuations in the calculation of container fullness thereby providing a more accurate determination of the fullness of each container and reducing the frequency of and the expense of hauling.

Another embodiment of the automated trash management system of the present invention measures the fullness of a trash container in operative association with a packing system having a compression member for engaging and compacting the trash in the container and having a limit switch activated by the compression member when fully extended, the automated trash management system comprising a sensing device for monitoring the pressure provided to the compression member by the packing system, means for receiving the pressure from the sensing device when the limit switch is activated by the compression member, and means for calculating the fullness of the trash container based upon the monotonically increasing portions of the monitored pressure.

In a more narrow sense, the automated trash management system of the present invention measures the fullness of a trash container associated with a packing system having a compression member for engaging and compacting the trash in the container comprising a limit switch activated by the compression member when fully extended by the packing system, a sensing device for monitoring the pressure provided by the packing system to the compression member, means for receiving the pressure from the sensing device when the limit switch is activated by the compression member, and means for calculating the fullness of the trash container based upon the monotonically increasing portions of the monitored pressure.

BRIEF DESCRIPTION OF THE DRAWINGS

The accompanying drawings, which are incorporated in and constitute a part of the specification, illustrate preferred embodiments of the invention and, together with the general description of the invention given above and the detailed description of the preferred embodiments given below, serve to explain the principles of the invention.

FIG. 3 depicts a schematic representation of the compactor/container unit illustrated in FIG. 2;

FIG. 4 is a block diagram illustrating the automated trash management system of the present invention for use with a compactor/container unit having a limit switch;

FIG. 7 depicts a schematic presentation of a single compactor/container unit not having a limit switch and adapted for use with the automated trash management system of the present invention;

FIG. 8 is a block diagram illustrating the automated trash management system of the present invention for use with a compactor/container unit not having a limit switch;

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
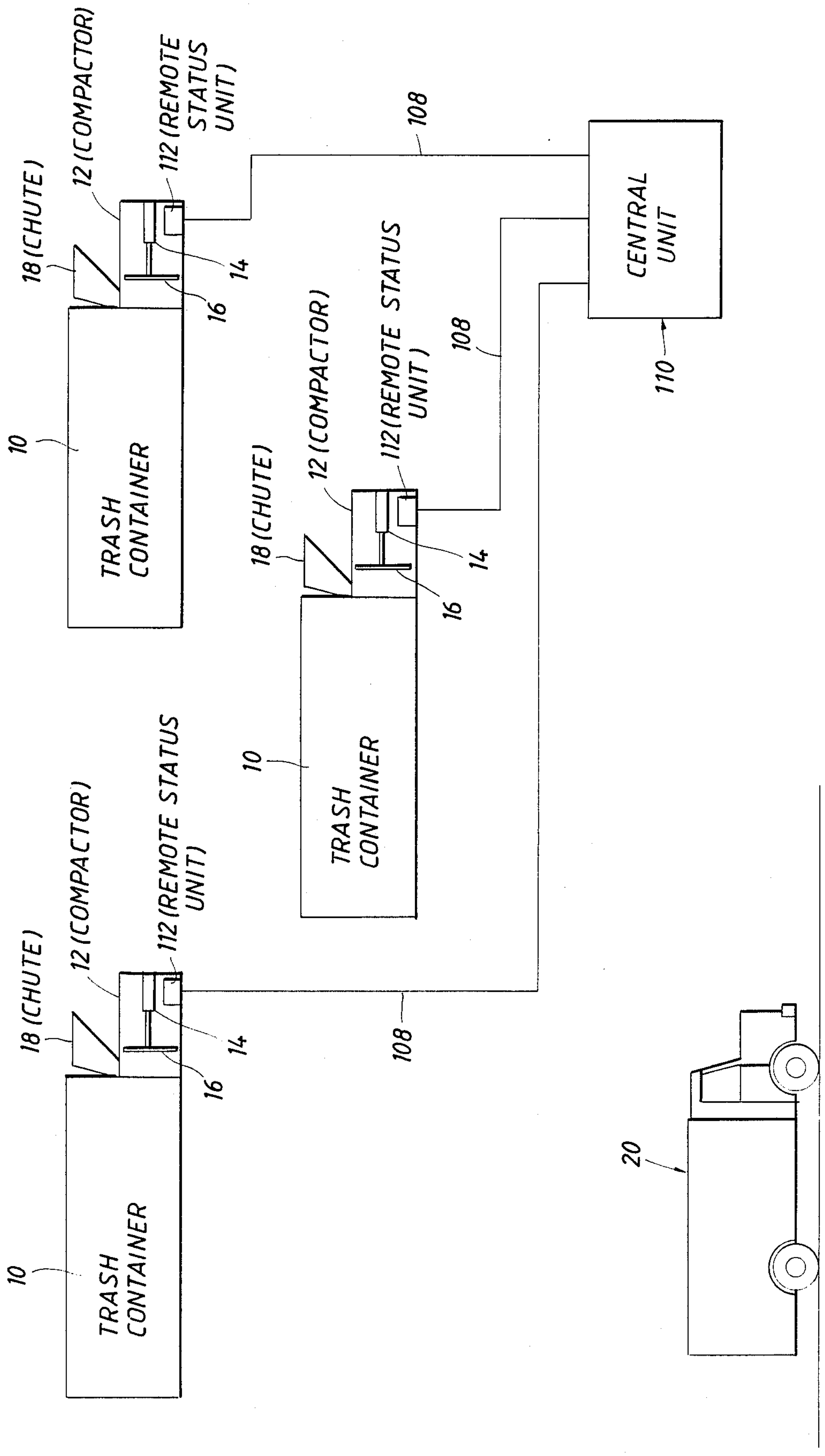
FIG. 1 depicts a schematic representation of an automated trash management system of the present invention.

FIG. 1 illustrates an automated trash management system of the present invention. The primary elements of the automated trash management system are the remote status units 112, the central unit 110 and the communication linkages 108. A remote status unit 112 is operatively associated with three different containers 10 and their associated compactors 12. Each of the remote status units 112 are connected to the central unit 110 by the communications linkage 108. The remote status unit 112 acquires information based upon the packing system 14 which is used to compact the trash in each container 10. Trash is inserted into the container 10 through the chute 18. The packing system 14 packs the trash inserted in the chute 18 using the compaction member 16. The remote status unit 112 acquires information about the packing of the trash in the container 10 and transmits this information to the central unit 110 through the communications linkage 108. The central unit 110 acquires the information from each remote status unit 112 to build a data base concerning the level of fullness of each container 10. The central unit 110 monitors the fullness of the containers 10 as the containers are filled with trash. The indication of fullness acquired from the central unit 110 is transferred to the hauler. The hauler sends a truck 20 to empty the containers 10 when appropriately full. Thus, the automated trash management system provides a mechanism by which a plurality of containers 10 can be independently monitored to provide disposal only when each individual container 10 is sufficiently full.

Figure 2:
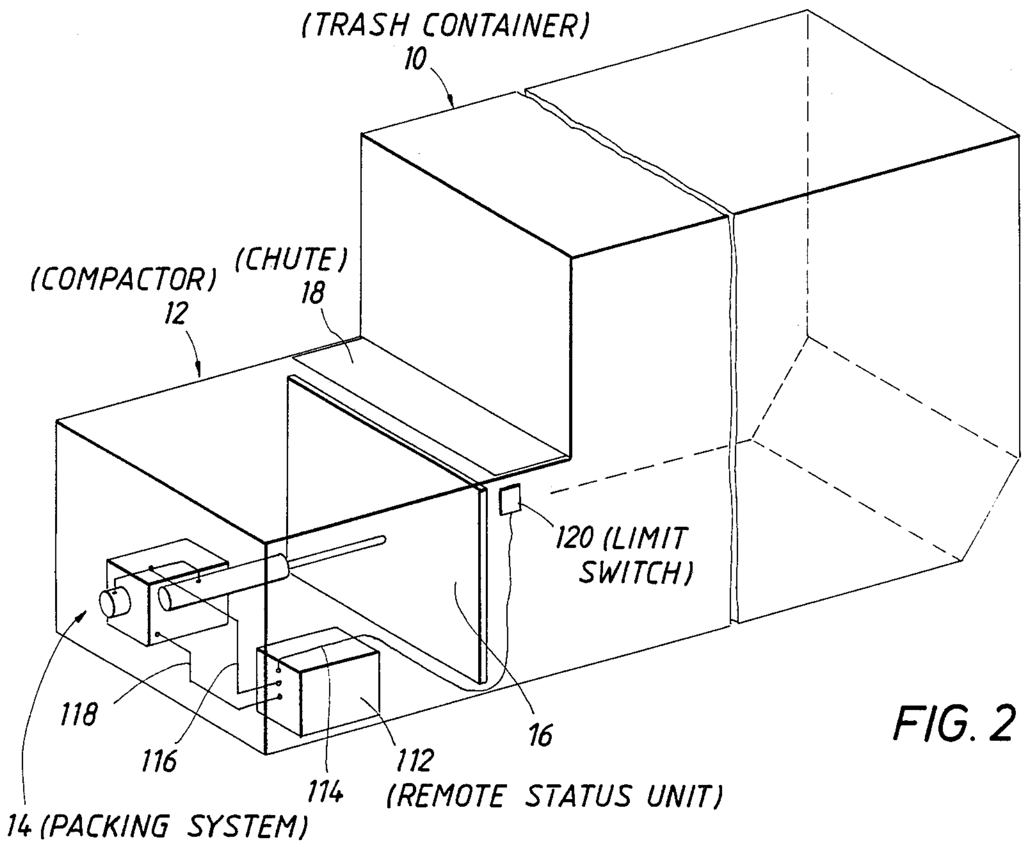
FIG. 2 illustrates a perspective view of a single compactor/container unit having a limit switch and adapted for use with the automated trash management system of the present invention.

FIG. 2 illustrates a perspective view of a single compactor/container unit adapted for use with the automated trash management system of the present invention. The compactor 12 is attached to the container 10. A chute 18 is oriented so that trash placed in the container 10 through the chute 18 can be engaged by the compactor 12. The remote status unit 112 acquires the appropriate information from the compactor 12. Primarily, the remote status unit 112 monitors the hydraulic drive pressure associated with the packing system 14. The remote status unit 112 is adaptable to connect to the power supply of the packing system 14. A power connector 118 is utilized by the remote status unit 112 to acquire power from the packing system 14. Likewise, information is acquired from the packing system 14 of the compactor 12 by similar connections. A limit switch connection 114 is utilized to acquire information about the placement of the compression member 16 and about the number of pack cycles of the compactor 12. A pressure connection 116 is connected to a hydraulic line which provides forward motive force from the packing system 14 to the compression member 16. The information acquired from the limit switch connection 114 and the pressure connection 116 are used in conjunction to count the pack cycles, determine the placement of the compression member 16 and measure the hydraulic drive pressure.

FIG. 2 illustrates the compression member 16 extended by the packing system 14 toward the limit switch 120. As the compression member 16 extends toward the container 10, the trash placed in the chute 18 is compressed. When the compression member 16 engages the limit switch 120, the packing system 14 stops applying pressure to the compression member 16. Typically, the compression member 16 is withdrawn by the packing system 14 and a duration of time passes prior to the compression member 16 being forced by the packing system 14 to again compress trash in the container 10. Alternatively, the compression member 16 can remain in a forward position rather than being withdrawn.

FIG. 3 depicts a schematic representation of the compactor/container unit illustrated in FIG. 2. The packing system 14, as illustrated in FIG. 3, is conventional and many different systems are well known. The packing system 14 as illustrated has five primary components. The components of the packing system 14 are a hydraulic power pack 22, a control panel 24, an electrical connection 26, a first hydraulic line 28 and a second hydraulic line 30. Power is supplied to the packing system 14 through the control panel 24. The control panel 24 provides power to drive the hydraulic power pack 22. The hydraulic power pack 22 drives the compression member 16 utilizing the hydraulic lines 28 and 30. Also, the control panel 24 monitors each cycle of the compression member 16 utilizing the limit switch 120. The limit switch 120 is connected to the control panel 24 via the limit switch connector 114. Thus, the control panel 24 can acquire information from the limit switch 120 via the limit switch connector 114 concerning the position of the compression member 16.

The remote status unit 112 is connected to the control panel 24 using the electrical connection 122. The electrical connection 122 provides power to the remote status unit 112 and provides information with respect to the position of the compression member 16 based upon the engagement of the limit switch 120.

FIG. 3 illustrates the remote status unit 112 being connected to the hydraulic line 30 by the pressure connector 116. Thus, as the hydraulic power pack 22 provides hydraulic power/force through the hydraulic line 30 to drive the compression member 16, the remote status unit 112 can acquire information about the magnitude of the pressure through the pressure connector 116. Therefore, the remote status unit 112 can acquire information with respect to the position of the compression member 16 from the control panel 24 via the electrical connection 122 and acquires information about the hydraulic drive pressure supplied to the compression member 16 via the pressure connector 116.

The packing system 14 illustrated in FIG. 3 may or may not be fitted with a limit switch 120. However, if the packing system 14 does not have the limit switch 120 prior to being adapted for the automated trash management system of the present invention, the packing system 14 can be retrofitted to have a limit switch 120. An alternative embodiment for practicing the present invention without the use of or the requirement of a limit switch is discussed below.

FIG. 4 is a block diagram illustrating the automated trash management system of the present invention for use with a compactor/container unit having a limit switch 120. A pressure sensor 124 provides information to an analog/digital (A/D) converter-scaler 126 which in turn counter 130. The limit switch 120 provides information to a limit switch modulator 128. The limit switch modulator 128 provides that there are no extraneous signals due to the bouncing of the limit switch contacts or some other intrinsic characteristic of the limit switch. Also, the limit switch modulator 128 provides a mechanism by which extraneous readings from the limit switch 120 are avoided because of the lack of total engagement of the limit switch 120 by the compression member 16. The pack cycles indicated by the engagement by the limit switch 120 with the compression member 16 is supplied to the data smoother/counter 130. The data smoother/counter 130 smooths the data to remove extraneous readings. For example, an extraneous reading would be when the pressure is high and the container 10 is not full. The smoothed data and the pack cycles are provided to a telephone controller 130. The telephone controller 130 provides the pressure data and the cycle data to the central unit 110 (not illustrated in FIG. 4) either via a telephone interface 136 or via a modum 134 and telephone interface 136.

Figure 5:
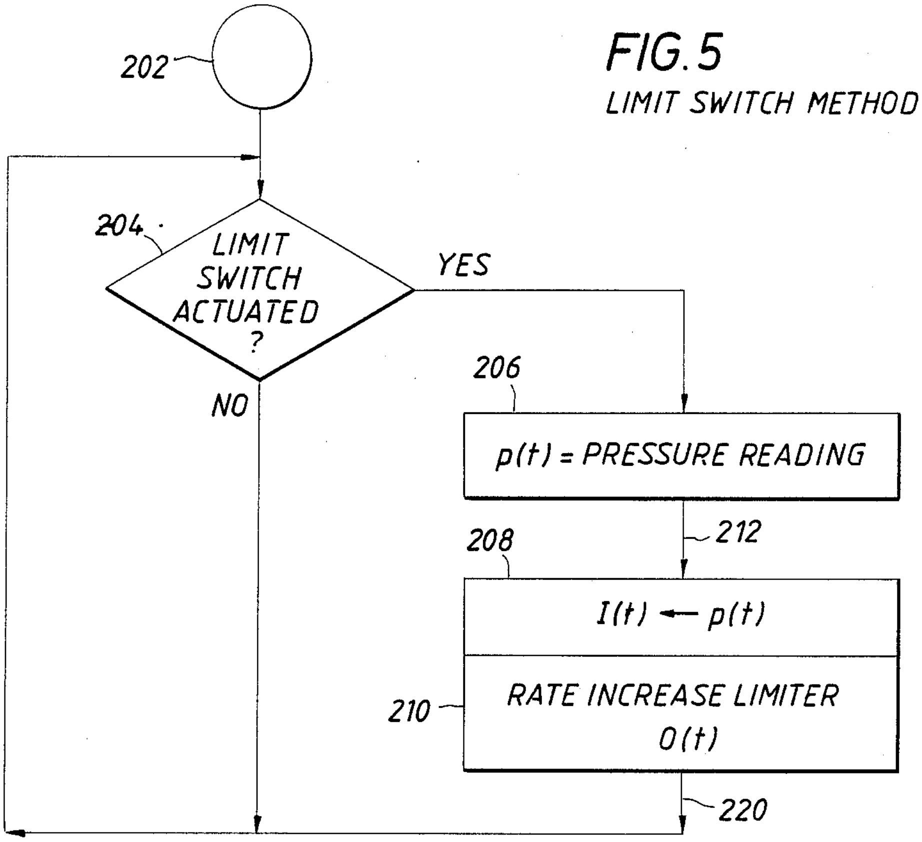
FIG. 5 is a flow diagram illustrating the evaluation procedure of the automated trash management system of the present invention for use with a compactor/container unit having a limit switch as illustrated in FIGS. 2, 3 and 4.

FIG. 5 is a flow diagram illustrating the evaluation procedure of the automated trash management system of the present invention used with a packing system 14 that either initially had a limit switch 120 or has been retrofitted with a limit switch 120. To smooth data associated with a compactor/container unit having a limit switch 120 requires that a simultaneous reading be made of the hydraulic drive pressure when the limit switch is activated. The flow diagram depicted in FIG. 5 uses the drive pressure and the limit switch information as input. As illustrated in FIG. 5, when the electrical signal from the limit switch 120 indicates that the switch has been activated, the hydraulic drive pressure reading is set to an initiating value, P(t). At the time P(t) is set, the pressure reading is input to a rate increase limiter device 210. The rate increase limiter device 210 simultaneously analyzes the consecutive pressure readings as the limit switch 120 is activated. The output from the rate increase limiter device 210 is O(t). The output pressure, O(t), is accumulated each time the limit switch 120 is activated.

An integral part of the present invention is the use of a rate increase limiter device 210 by which the input data is smoothed to minimize the effects of material tumbling in the container 10. Material tumbling in the container 10 causes up and down fluctuation in the pressure readings. If the fluctuations in the pressure readings are sufficiently high due to material binding and not adequately compacting, the container 10 may be misevaluated as approaching full and the container prematurely emptied. The rate of increase limiter device 210 receives the pressure reading in association with the pack cycles to provide a relative fullness reading as an output.

Figure 6:
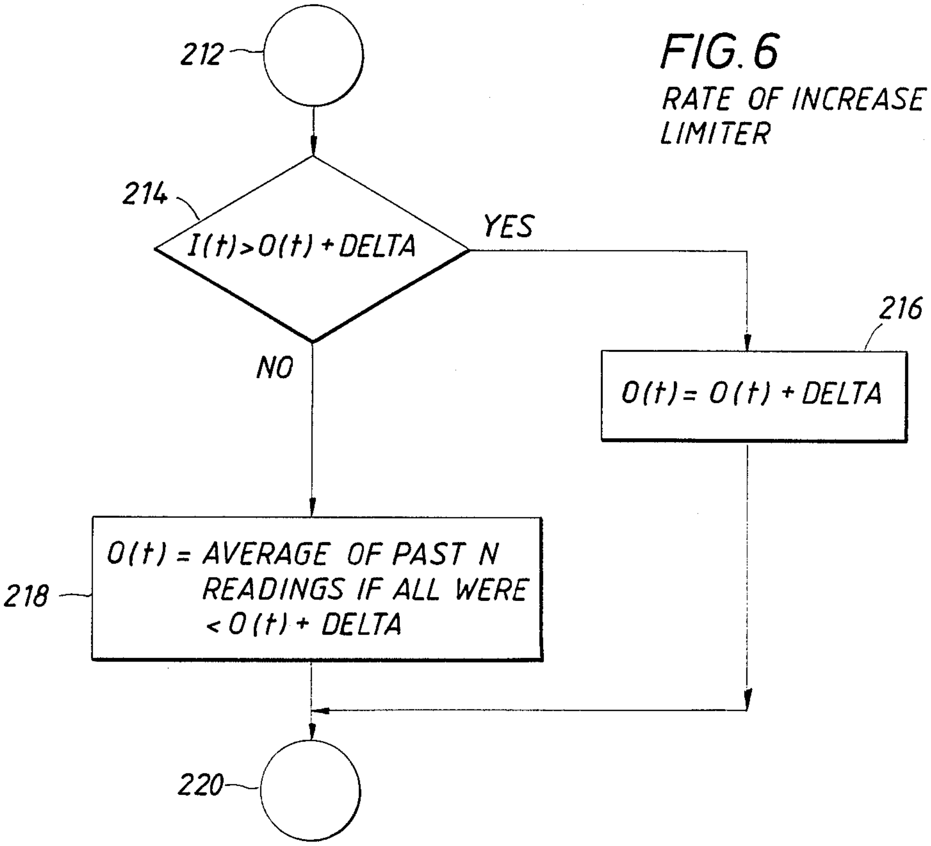
FIG. 6 is a flow diagram depicting the rate of increase limiter device illustrating the mechanism for limiting the rate of increase of pressure when utilizing the automated trash management system of the present invention.

FIG. 6 is a flow diagram depicting the rate of increase limiter device 210. FIG. 6 illustrates the mechanism for limiting the rate of increase of pressure to eliminate extraneous high pressure readings. The hydraulic drive pressure, when the compression member 16 is extended, is the input for the rate of increase limiter device 210 as indicated by the pressure input. When the rate of increase limiter device 210 is initially activated, the reported value is initialized with a value which indicates that no reading has yet been taken. When an initial reading is obtained, the reported value, O(t), is initialized as a first reading. The first reading is represented by $O(t)=I(t)$. After the initial reading, a pressure comparison 214 is initiated. The pressure comparison 214 provides that the previously reported value, O(t), plus a constant, DELTA, is compared with the present value, I(t), i.e., $I(t) > O(t)+\text{DELTA}$.

If the value of I(t) is greater than the sum of O(t) plus DELTA, then the increment step 216 is initiated. The increment step 216 sets the value of O(t) equal to O(t) plus DELTA, i.e., $O(t)=O(t)+\text{DELTA}$. Thereafter, the value of O(t) is provided to the output 220. Alternately, if the pressure comparison 214 is false, then the average of the past N readings are set to O(t), if all the past N readings were less than O(t) plus DELTA. If the averaging step 218 is initiated, the value of O(t) is provided to the output 220.

The value of DELTA utilized in the rate of increase limiter device 210 illustrated in FIG. 6 is dependent on the particular container/compactor unit being used. DELTA is a constant representing the typical maximum change in pressure in one cycle of the packing system 14. DELTA can be computed for a particular compactor/container unit by dividing the value representing the pressure associated with a full compactor/container unit by the typical minimum number of cycles to compact all the trash into a full container. For example, K equals the counts per pressure which is a characteristic of the A/D converter-scaler 126 and the pressure connector 116. Thus, DELTA equals the maximum increase in pressure for one cycle times a value K. If K equals one count per 20 psi and the maximum increase in pressure for one cycle is 30 psi, then, DELTA equals 30 psi times one count divided by 20 psi which equals 1.5. Since DELTA is an integer, the value of DELTA can be rounded either up or down to yield a value of 2 or 1, respectively.

The value of N utilized in the rate of increase limiter device 210 illustrated in FIG. 6 is a constant representing the number of consecutive low readings which must be obtained before lowering the reported value or the value received. The value of N is large enough to inhibit spurious low readings but is not sufficiently large to delay an appropriate low reading. Typically, the value of N is between five and ten. The averaging step 218 provides the mechanism by which the data is smoothed. Since the input value, I(t), may cycle up and down, the general upward trend of I(t), may cycle up and down, the general upward trend only allowed to increase and not decrease. Utilizing the averaging step 218 under the circumstances that several T(t) values are contiguously lower than I(t), O(t) is changed to a lower value. In determining the proper value of N, a trade-off is required. In determining the value of N, if N is too small, O(t) will cycle up and down similar to I(t) and if N is too large, O(t) will drop too far after I(t) has dropped. Empirically, it appears that a value for N greater than five and less than fifteen is desirable when utilizing conventional compactor/container units.

FIG. 7 depicts a schematic representation of a single compactor/container unit not having a limit switch adapted for use with the automatic trash monitoring system of the present invention. Specifically, the packing system 14 has the primary component parts comprising the hydraulic power pack 22, the control panel 24, the electrical connection 26, and the hydraulic lines 28 and 30. The packing system 14 illustrated in FIG. 7 is modified by a second embodiment of the present invention. The second embodiment provides that only the pressure is monitored. Based upon the fluctuations, of the hydraulic drive pressure, the automated trash management system determines the fullness of the container 10. The remote status unit 112 is connected to the control panel 24 by the electrical connection 122. The electrical connection 122 provides power to the remote status unit 112. The hydraulic drive pressure associated with the hydraulic power pack 22 is extracted utilizing the pressure connection 116.

FIG. 7 illustrates an embodiment of the present invention which does not utilize a limit switch. The embodiment of the present invention as illustrated in FIG. 7 determines an appropriate pressure which indicates that the container 10 is approaching full. The pressure used to anticipate the fullness of the container 10 is determined by constantly monitoring the hydraulic drive pressure as a function of time. The hydraulic drive pressure is evaluated for the proper features which determine when the compression member 16 is positioned to provide maximum trash compaction. The remote status unit 112, utilizing boundary limits placed on the rate of change of the hydraulic drive pressure, extracts a pressure reading which represents maximum trash compaction. A plurality of the pressure readings are used to determine the fullness of the container 10.

FIG. 8 is a block diagram illustrating the embodiment of the present invention where the compactor/container unit does not have and is not retrofitted to have a limit switch. A pressure sensor 124 acquires the hydraulic drive pressure. The hydraulic drive pressure is provided to the A/D converter-scaler 126. The pressure from the A/D converter-scaler 126 is monitored by a pressure extractor 138 as well as by the data smoothing/counter 130. The appropriate characteristics of the pressure are monitored and evaluated for determining that the compression member 16 is fully extended and compressing the trash in the container 10. The pressure extractor 138 provides a pressure reading to the data smoothing/counter 130. Thereafter, the data is transferred as previously discussed and illustrated in FIG. 4.

Figure 9:
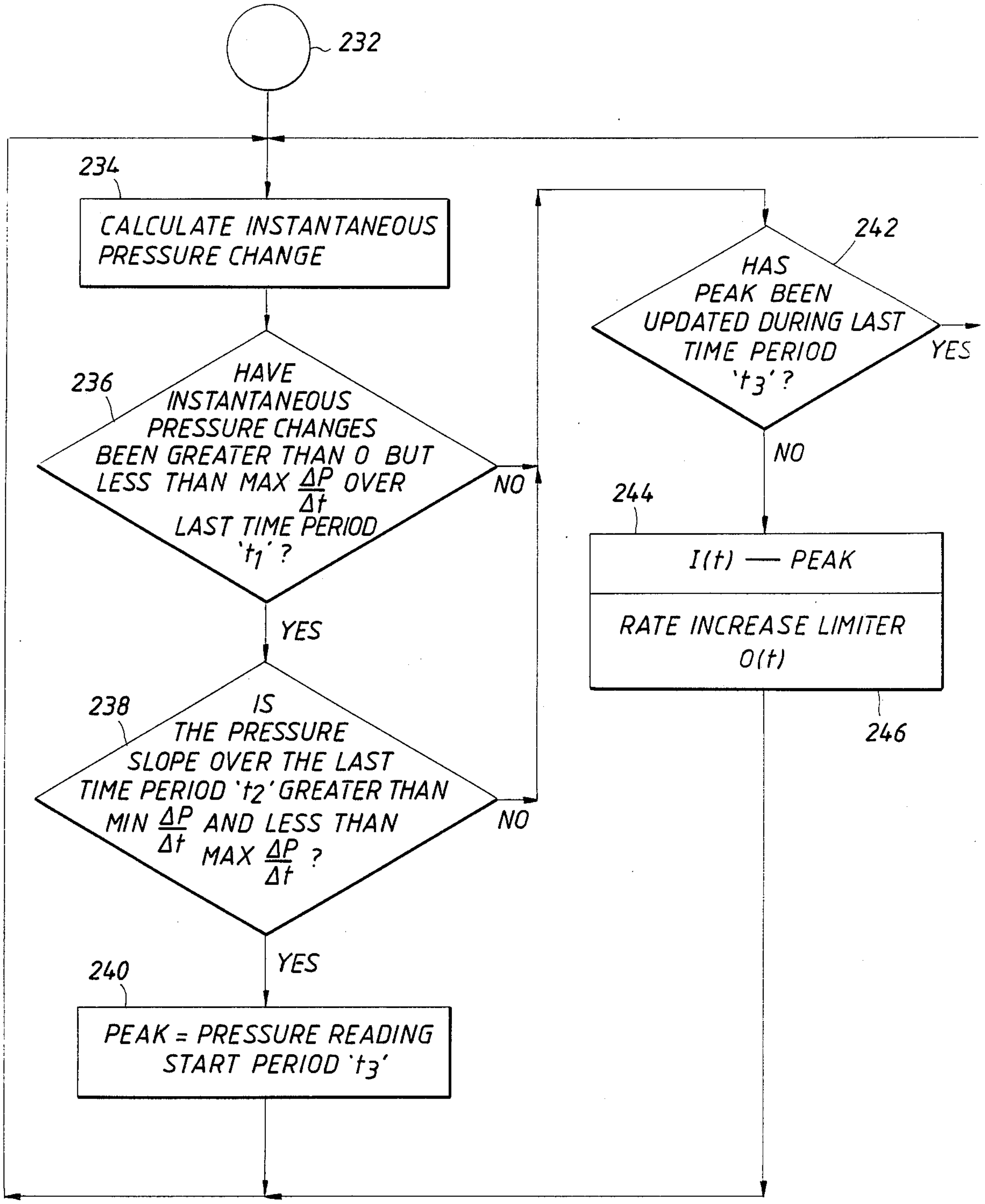
FIG. 9 is a flow diagram illustrating the evaluation procedure of the automated trash management system of the present invention for use with a compactor/container unit not having a limit switch as illustrated in FIGS. 7 and 8.

FIG. 9 is a flow diagram illustrating the evaluation procedure of the automated trash management system of the present invention for use with a compactor/container unit not having a limit switch. The pressure extractor device 138 utilizes the inherent hydraulic drive pressure present in conventional trash compactor/container units. Generally, any step changes and/or impulses in the hydraulic drive pressure are associated with either hydraulic switching or when the compression member 16 is fully extended. When a compression member cycle includes no ramp or monotonically increasing features, i.e., only step changes or impulses, the container 10 typically does not have enough trash in it to produce back pressure on the compression member when fully extended. When this phenomena is present while the compression member is in a compacting mode, the constant hydraulic drive pressure provides a base line pressure for a relatively empty container.

Alternately, the presence of constant pressures, of peaks associated with slowly increasing ramps or of exponentially increasing curves are an indication that a reading should be extracted and utilized as an indication of the position of the compression member 16. When a cycle includes a gradually increasing pressure feature, the peak of the gradually increasing pressure feature can be determined to be the back pressure on the compressin member 16 when it is at a position of maximum compaction. By monitoring these pressure features, it is possible to determine (1) when the compression member 16 is fully extended, and (2) the pressure when the compression member is fully extended even without any direct measurement of the position of the compression member.

The pressure extractor 138 illustrated in FIG. 8 and depicted as a flow diagram in FIG. 9 is a device that finds the peak of a gradually increasing pressure function by comparing a current reading to previous readings to determine if the pressure is increasing monotonically. The difference in the consecutive hydraulic drive pressures are compared with a predetermined criteria to determine if the peak pressure has been reached. The criteria requires that the difference in the consecutive measurements of the hydraulic drive pressure is less than a maximum allowed slope and greater than a minimum allowed slope. The resultant peak pressure for the compression cycle is used as the input value for the rate of increase limiter device as previously discussed.

FIG. 9 is a flow diagram illustrating the pressure extractor device 138. The pressure extractor device 138 determines the peak non-extraneous pressure for a given compression cycle. The pressure input 232 to the pressure extractor device 138 is accepted as input from the A/D converter-scaler 126. In the pressure change mechanism 234, the instantaneous pressure change is recorded. The instantaneous pressure change is provided to the comparison of pressure changes mechanism 236. The instantaneous pressure changes are compared with a set of criteria. Typically, the criteria are that the pressure changes must be greater than zero but less than the maximum change in pressure per change in time over a specified time period, e.g., $t_1$. If the criteria are met, the pressure is transferred to the comparison of slope mechanism 238. The comparison of slope mechanism 238 compares the slope of the received pressure to a specified criterion. The criteria used by the slope mechanism 238 are that the slope of the changing pressure being monitored must be (1) greater than some minimum change in pressure per change in time and (2) less than some maximum change in pressure per change in time over a specified time period, e.g., $t_2$. If the second criterion is met then the pressure reading is the peak and a third specified time period, e.g., $t_3$, is started. If either of the two criteria as specified in the pressure change mechanism 236 or the slope mechanism 238 is not met, the instantaneous pressure change is transferred to the peak update mechanism 242. The peak update mechanism 242 determines if the peak has been updated during the last time period, $t_3$. If the instantaneous pressure change has been updated during the last time period, $t_3$, the information is recycled as input to the pressure change mechanism 234. If the peak has not been updated during the last time period, $t_3$, the peak is transferred to the assigned pressure peak mechanism 244 as value I(t). The value I(t) is provided to the rate increase limiter mechanism 246. The rate increase limiter mechanism 246 is the same device previously described and illustrated in FIG. 6.

The criteria used in the pressure change mechanism 236 and the slope mechanism 238 are empirical and based upon the particular compactor/container unit on which the automated trash management system is applied. The maximum change in pressure per change in time represents a comparison of compressible material by the particular compactor/container unit. For example, 1500 psi per second has been determined a reasonable value for the maximum change-in-pressure over change-in-time. The minimum value of change-in-pressure over change-in-time is also an empirical value. The minimum value represents a large enough increase in pressure over change-in-time to distinguish the compression of material from random pressure fluctuations when material is not being compressed. As illustrated in FIG. 9, $t_3$ is a constant representing approximately one-half ($\frac{1}{2}$) of the time necessary to complete a single cycle. For example, a compression cycle may take approximately 30 seconds. Therefore, $t_3$ would equal approximately 15 seconds. The value of $t_2$ is a constant representing approximately one-fourth ($\frac{1}{4}$) to one-fifth (1/5) of the value of $t_3$ which represents approximately one-eighth ($\frac{1}{8}$) of a compression cycle. For example, if a compression cycle is approximately 30 seconds then the value of $t_2$ would be approximately 3 seconds. The value of $t_1$ is a constant representing approximately $\frac{1}{3}$ of the value of $t_2$ and representing approximately 1/24 of a complete compression cycle. Using the example given above, a value of $t_1$ would be approximately 1 second.

Figure 10:
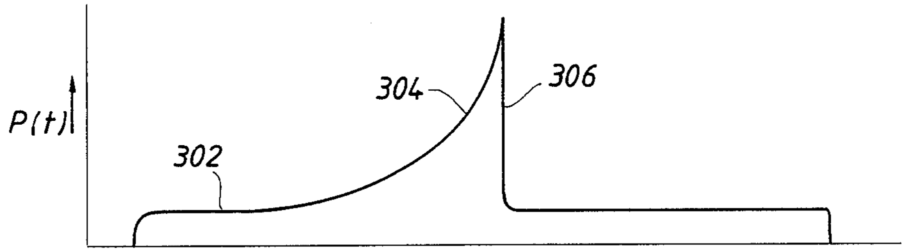
FIG. 10 depicts a graph illustrating the typical monotonic increase in pressure with respect to time and the typical step decrease in pressure with respect to time as a compression member compacts trash in a container and withdraws, respectively.

FIG. 10 is a graph illustrating a typical monotonically increasing pressure function with respect to time. Also, FIG. 10 illustrates the typical step decrease in pressure with respect to time as the compression member 16 compacts trash in a container and withdraws, respectively. The initial flat part of the curve 302 represents the compaction member 16 moving forward to compress the trash in the container 10. As the compaction member moves forward and the trash begins to provide resistance, the pressure increases with respect to time. The monotonic increase 304 illustrates the resistance provided by the trash when being compacted by the compaction member 16. When the compaction member 16 has fully extended and begins reversing direction, the step function decrease 306 is a result of a sharp decrease in pressure with respect to time. It is the monotonic increase 304 that is being evaluated by the pressure extractor 138 to determine when the compaction member 16 is fully extended against the trash.

Figure 11:
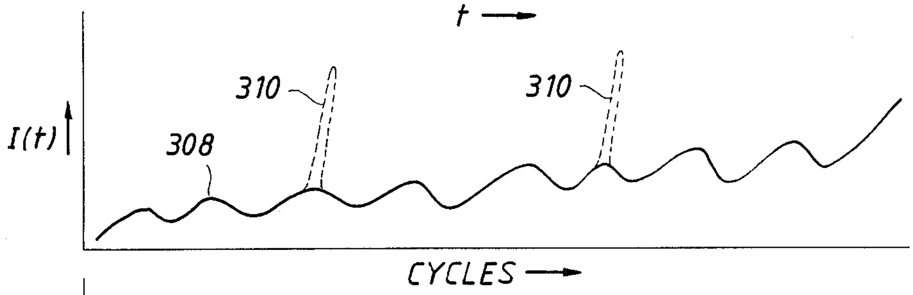
FIG. 11 is a graph illustrating the typical cyclic pressure associated with the compaction cycles as a container is progressively filled.

FIG. 11 is a graph illustrating the typical cyclically increasing pressure with respect to the compaction cycles or with respect to time as a container is progressively filled. It should be noted that the oscillating curve 308, although progressively increasing, has specific extraneous spikes 310 which may be interpreted as a full container or a contain approaching fullness when indeed the container is at best partially full. It is the extraneous values represented by the larger-than-normal spikes 310 that are eliminated by the rate of increase limiter device 210 as previously described and illustrated in FIG. 6.

Figure 12:
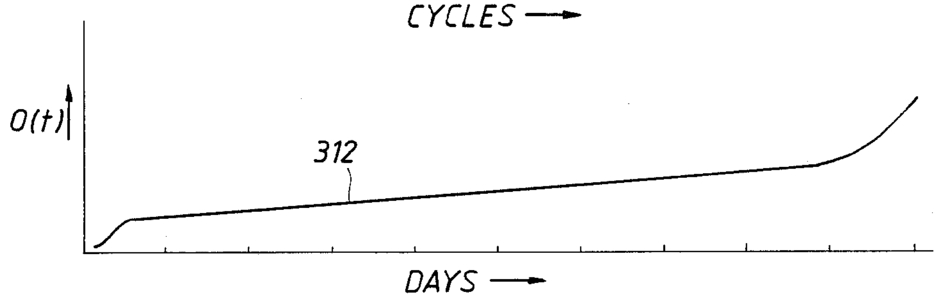
FIG. 12 depicts a graph of the resultant smooth curve achieved with the automated trash management system of the present invention illustrating the increase in pressure with respect to time as a container is progressively filled.

FIG. 12 depicts a graph of the resultant smooth curve 312 achieved with the automated trash management system of the present invention. FIG. 12 illustrates the increase in pressure with respect to time as a container is progressively filled. The progressively increasing value of pressure illustrated in FIG. 12 is free from the extraneous increases and decreases as exhibited in the raw input data illustrated in FIG. 11.

Additional advantages and modifications will readily occur to those skilled in the art. The invention in its broader aspects is therefore not limited to the specific details, representative apparatus, and the illustrative examples shown and described herein. Accordingly, departures may be made from the detail without departing from the spirit or scope of the disclosed general inventive concept.

What is claimed is:

1. Apparatus for measuring the level of fullness of a trash compactor having a compression member for packing the trash, the trash compactor including a hydraulic pressure line carrying hydraulic fluid under pressure to energize said compression member during compaction strokes of trash in the trash compactor, and a limit switch for generating a limit switch signal when said compression member has reached its maximum compaction travel during each cycle of said compression member, the apparatus comprising, means connected to said hydraulic pressure line for generating a pressure signal indicative of the hydraulic pressure driving said compression member during each compression cycle, means responsive to said limit switch signal and to said pressure signal for generating a current maximum pressure signal during each compaction cycle when said compression member has reached its maximum compaction travel, means responsive to said limit switch signal for counting the compaction cycles, means for modifying said current maximum pressure signal during any compression cycle so that it cannot increase from the value to be reported more than a predetermined pressure amount, and means for storing said modified pressure signal as a function of the number of compaction cycles, wherein said modified pressure signal as a function of the number of compaction cycles is indicative of the level of fullness of said trash compactor.

2. The apparatus of claim 1 further comprising, means for determining if said current maximum pressure signal has increased from said previous compression cycle less than said predetermined pressure amount, and if so, modifying said maximum pressure signal to be the average of previous compaction cycle maximum pressure signals which were less than the said current maximum pressure signal plus said predetermined pressure amount.

3. A monitoring system for measuring the fullness of a plurality of trash containers, each trash container in operative association with a packing system having a compression member for engaging and compacting the trash in the trash container and having a switch in operative association with the compression member for controlling the movement of the compression member by the packing system, the monitoring system comprising:

(a) a plurality of remote status units each in association with a trash container comprising (1) a sensing device for continuously monitoring the instantaneous pressure provided to the compression member by the packing system, and (2) means for accepting the instantaneous pressure from said sensing device when the switch indicates the compression member has maximum compaction on the trash and for determining the fullness of the trash container based upon the specific instantaneous pressures, (b) a central unit for receiving the container fullness from each remote status unit and for compiling a data base of the fullness of each trash container, and (c) a communications linkage for transferring the fullness calculations from said plurality of remote status units to said central unit such that the fullness of each trash container can be monitored at the single location of said central unit and, from the single location, authorization to a hauler to empty the trash containers can be restricted to only those containers which are full thereby reducing the frequency of and the expense of hauling.

4. A monitoring system as defined in claim 3 wherein said means for determining fullness comprises a rate of increase limiting device for receiving from said sensing device the instantaneous pressures provided to the compression member by the packing system for smoothing the received data to minimize the effects of material tumbling in the trash container for eliminating large spurious fluctuations in the calculation of container fullness thereby providing a more accurate determination of the approaching fullness of each container and reducing the frequency of and the expense of hauling.

5. A monitoring system as defined in claim 4 such that delta is a constant representing the maximum change in pressure in one cycle of the packing system and N is a constant representing the number of consecutive low readings to be obtained before lowering the monitored pressure value wherein said rate of increase limiting device comprises:

(a) means for receiving and comparing an instantaneous pressure from said sensing device with the prior instantaneous pressure plus delta (b) means for outputting an incremented value equal to the sum of the prior instantaneous pressure plus delta, if the instantaneous pressure is greater than the prior instantaneous pressure plus delta, and (c) means for outputting an average of the past N instantaneous pressures if all N instantaneous pressures were less than or equal to the prior instantaneous pressure plus delta, if the instantaneous pressure is less than the prior instantaneous pressure plus delta, thereby lowering the magnitude of the pressure that is output and avoiding large extraneous pressures.

6. A monitoring system for measuring the fullness of a trash container in operative association with a packing system for engaging and compacting the trash in the trash container comprising (a) a sensing device for continuously monitoring the instantaneous pressure provided by the packing system to the trash, (b) means for ascertaining, from the pressures monitored by said sensing device, the contiguous monotonically increasing pressures, and (c) means for storing said pressures, said pressure being indicative of the fullness of the trash container.

7. A monitoring system as defined in claim 6 wherein said means for determining the pressure of maximum compactness of the trash comprises (a) means for receiving the instantaneous pressures from said sensing device for determining instantaneous pressure changes, (b) a pressure change device for determining if each pressure change associated with said means for receiving is greater than zero and less than the maximum change-in-pressure per change-in-time for the packing system, (c) a slope analyzing device for determining if the slope of the pressure changes from said means for receiving is greater than the minimum change-in-pressure per change-in-time to distinguish the compression of trash from random pressure fluctuations and less than the maximum change-in-pressure per change-in-time for the packing system, (d) a peak pressure device for receiving the pressure from said pressure change device and said slope change device, if appropriate, as an indication of the end of a compression cycle for the packing system thereby updating the peak, and (e) an update device for receiving rejected pressures from said pressure change device and, if the peak has been updated within the last half compression cycle of the packing system, initiating said receiving means, if the peak has not been updated within the last half compression cycle, said means for ascertaining the fullness is initiated.

8. A monitoring system as defined in claim 6, such that delta is a constant representing the maximum change in pressure in one cycle of the packing system and N is a constant representing the number of consecutive low values to be obtained before lowering the monitored pressure value, wherein said means for ascertaining the fullness of the trash container comprises (a) means for receiving and comparing a pressure value with the previous pressure value plus delta, (b) means for outputting a pressure value which is the sum of the previous pressure value plus delta, if the current pressure value is greater than the previous pressure value plus delta thereby avoiding bias caused by large extraneous pressure values, and (c) means for outputting the current pressure values if all N instantaneous pressures were less than or equal to the previous pressure values, given that the pressure value is less than the previous pressure value plus delta thereby lowering the magnitude of the output pressure.

9. A monitoring system for measuring the fullness of a trash container in operative association with a packing system having a compression member for cyclically engaging and compacting the trash in the trash container comprising (a) a switch in operative association with the compression member, (b) a sensing device for continuously monitoring the instantaneous pressure provided by the packing system to the compression member, and (c) means for determining the maximum compaction pressure from said sensing device during each compression cycle of said compression member when said switch indicates the compression member has maximum compaction on the trash, and for determining such maximum compaction pressures as a function of the number of cycles of said compression member, for determining the fullness of the trash container.

10. The monitoring system of claim 9 further comprising, (d) means for smoothing said maximum compaction pressures as a function of said compaction cycles, said smoothed function of pressures for determining the degree of fullness of said trash container.

11. A monitoring system for measuring the fullness of a trash container in operative association with a packing system having a compression member for cyclically engaging and compacting the trash in the container and having a switch activated by the compression member when fully extended for controlling the movement of the compression member by the packing system, the monitoring system comprising, (a) a sensing device for continuously monitoring the instantaneous pressure provided to the compression member by the packing system, and (b) means for determining the maximum compaction pressure from said sensing device during each compression cycle of said compression member when said switch indicates the compression member has maximum compaction on the trash, and for determining such maximum compaction pressures as a function of the number of cycles of said compression member, for determining the level of fullness of the trash container.

12. The monitoring system of claim 11 further comprising, (c) means for processing said maximum compaction pressures as a function of compaction cycles to produce a smoothed maximum compaction pressure series as a function of compaction cycles, said smoothed maximum compaction pressure series being indicative of the degree of fullness of said trash container.

* * * * *

UNITED STATES PATENT AND TRADEMARK OFFICE
CERTIFICATE OF CORRECTION

PATENT NO. : 4,773,027

DATED : September 20, 1988

INVENTOR(S) : Rodney H. Neumann

It is certified that error appears in the above-identified patent and that said Letters Patent is hereby corrected as shown below:

On the face of the patent, the following reference patents should appear

| Document No. | Date | Name | Class | Sub class |
|---|---|---|---|---|
| 4,643,087 | 2/17/87 | Fenner et al | 100 | 50 |
| 4,274,282 | 6/23/81 | Budratis et al | 100 | 99 |
| 3,765,147 | 10/16/73 | Ippolito et al | 100 | 49 |
| 4,116,050 | 9/26/78 | Tanahashi et al | 100 | 99 |
| 3,636,863 | 1/25/72 | Woyden | 100 | 49 |

Signed and Sealed this

Twenty-second Day of August, 1989

*Attest:*

DONALD J. QUIGG

*Attesting Officer*

*Commissioner of Patents and Trademarks*